UNITED STATES PATENT OFFICE.

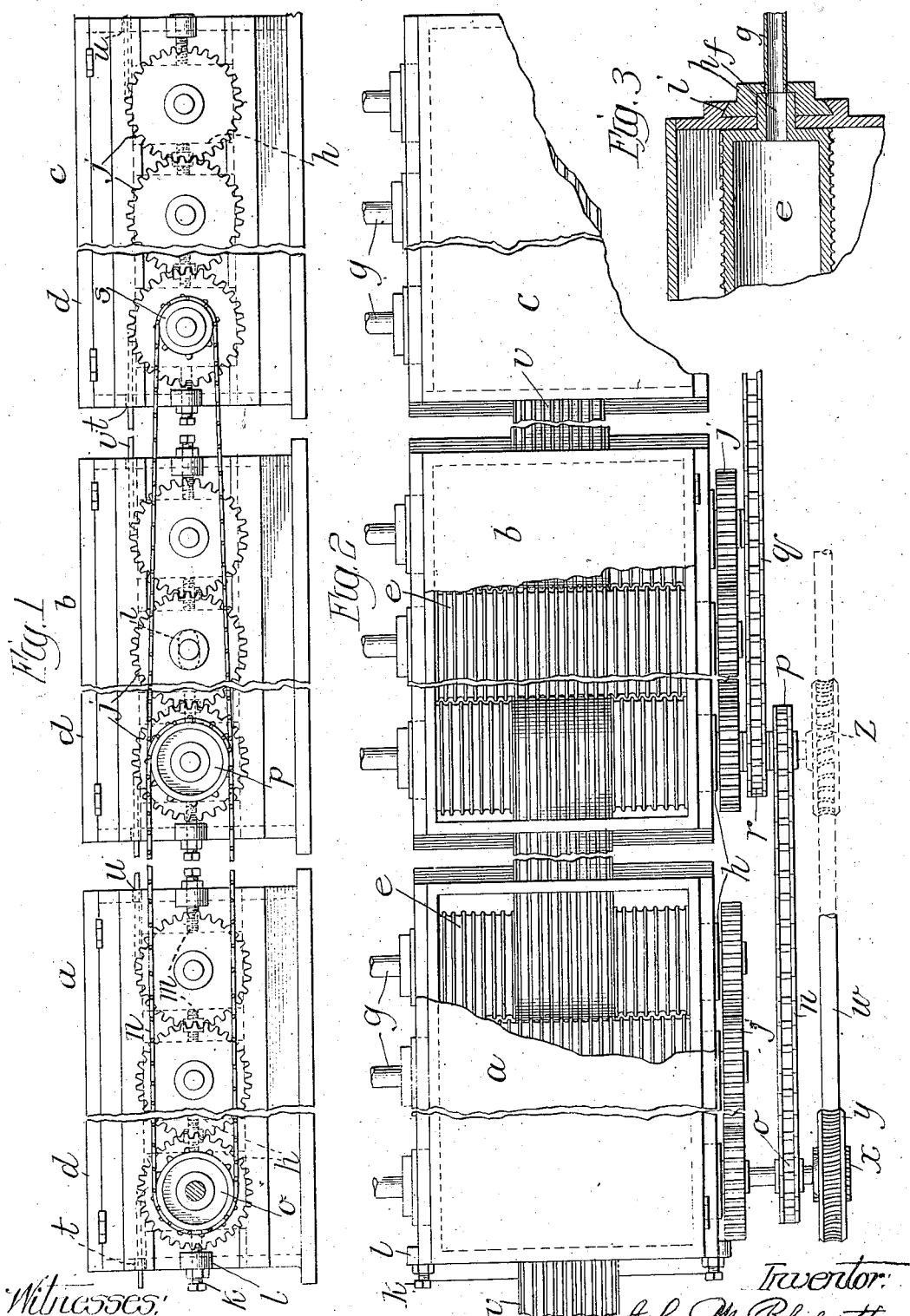

JOHN W. BLODGETT, OF CHICAGO, ILLINOIS, ASSIGNOR, BY DIRECT AND MESNE ASSIGNMENTS, TO JOHN HOWARD McELROY, TRUSTEE, OF CHICAGO, ILLINOIS.

MACHINE FOR MANUFACTURING BELTS.

1,166,574.           Specification of Letters Patent.          Patented Jan. 4, 1916.

Original application filed September 9, 1905, Serial No. 277,766. Divided and this application filed February 23, 1907. Serial No. 358,830.

*To all whom it may concern:*

Be it known that I, JOHN W. BLODGETT, a citizen of the United States, and resident of Chicago, in the county of Cook and State of Illinois, have invented certain new and useful Improvements in Machines for Manufacturing Belts, of which the following is a full, clear, and exact specification.

My invention is concerned with the apparatus by which I carry out my novel continuous process of making a belt of fabric saturated or coated with rubber, or some similar composition, to make it inelastic and waterproof, and my present application is a division of my original application #277,766 filed September 9, 1905, for a "Method of and apparatus for manufacturing belts," in which application I originally claimed not only the method but also the apparatus.

As the ordinary rubber belts have been made prior to my invention, several different layers of fabric, with a thin coating of rubber on each side of each piece of fabric, have been rolled together, and the belt thus made by the compound layers is vulcanized or cured in what are known as belt-curing presses, which consist of top and bottom plates with hollow interiors, so that they can be heated by steam or gas sufficiently to cure the belt. With the use of these curing presses, it will be apparent that only a single section, of a length depending on the length of the press, can be made at a time, so that the process is intermittent, as it were, as but a single section is made at a time, after which the press is opened and another section drawn into it and cured, and so on, until the desired length is completed.

By my invention, instead of using a curing press for belts, I use a rotary apparatus that will cure a belt by continuous process, and at any desired rate of speed, so that if a continuous strip of fabric is fed into the apparatus, a belt of any desired length is produced.

To illustrate my invention, I annex hereto a sheet of drawings, in which the same reference characters are used to designate identical parts in all the figures, of which,—

Figure 1 is a side elevation of the apparatus, the centers of the troughs being broken out to shorten the view, as well as the troughs being shown as immediately adjacent to each other, when, in fact, they are preferably separated by a very considerable distance; Fig. 2 is a top plan view of the same, but with a portion of the covers of two of the troughs broken away; and Fig. 3 is a vertical section through one of the calendering rolls.

The apparatus employed preferably consists of three troughs or receptacles $a$, $b$ and $c$, which, except as hereinafter indicated, may be of the same structure. They are preferably of a rectangular shape, and one of them is so constructed as to hold the liquid or paste composition, and all are preferably provided with covers $d$ to assist in retaining the heat applied to the rollers $e$, of which there are a plurality, preferably journaled horizontally on the same level. The surface of these rollers may be smooth, if a smooth belt is to be manufactured, or annularly grooved, as shown, if a corrugated belt is to be manufactured, such as is shown in my Patent No. 761,054, dated May 24, 1904. These rollers, as shown, are hollow, and some of them are necessarily so, and all of them are preferably hollow, and are provided at one end with the hollow journal $f$ adjacent the end of the pipe $g$, through which steam or other heating fluid may be introduced. The journal $f$ is, of course, mounted to rotate in the sliding box $h$, which is preferably mounted to move horizontally in the dovetailed ways formed on or secured to the side of the trough, and the aperture $i$, through which the journal passes through the side of the box, is slightly elongated horizontally, as shown, in order that the rollers may be adjusted to bring them as near to or far from each other as is desired. The journals at the other end of the rollers are preferably solid, and have secured thereon the gear wheels $j$ of the same size, by which all the rollers in each trough are compelled to rotate in unison. The sliding boxes $h$ are the same at both ends, except that the boxes at the lower end, as seen in Fig. 2, need not be provided with the threaded apertures in which the pipes $g$ are secured. To accurately regulate the distance between each of the rollers, I provide the set screws $k$, which are screwed through the lugs $l$ at the ends of the boxes and take against the outer sides of the outermost boxes $h$, while the remaining sides of the boxes have screwed therein the headed bolts $m$, the heads of the adjacent bolts contacting, so that by screwing the bolts in or out, the distance between the adjacent rollers can be accurately adjusted. Suitable mechanism for driving all of the rollers is provided, such, for instance, as the sprocket chain $n$ engaging the sprocket wheels $o$ and $p$ on the shafts of two of the rolls in the boxes $a$ and $b$, and the sprocket chain $q$ engaging the sprocket wheels $r$ and $s$ secured on the ends of two of the rollers in the boxes $b$ and $c$. The troughs are provided at their ends with the apertures $t$ and $u$, by which the belt $v$ enters and emerges from each trough, each of these apertures preferably being placed at about the level of the tops of the rollers.

The operation of making the belt with my improved apparatus is as follows: The trough $a$ is filled to nearly the level of the apertures $t$ and $u$ with the rubber, or similar compound, which is to be used in filling the belt, and the belt $v$ is introduced into this trough through the aperture $t$, in a loose condition, i. e., without being stretched. If the belt of my aforesaid patent is being manufactured, this fabric consists of a knitted fabric as it comes from the machine, and without being stretched any. The fabric of the belt $v$ passing through the trough $a$, passes over the first roller, under the second roller, over the third one, and so on, for as many rollers as may be employed, and I preferably use a considerable number, such as nine or eleven, in order that the compound may have a chance to thoroughly saturate the fabric by running through it and being pressed into it by the action of the rollers. I may apply some heat to the rollers in this trough, to heat the compound just enough to cause it to be thinner and penetrate the fabric, but not enough to vulcanize or harden it. The fabric thus saturated with and having the coating pressed into it, passes from the aperture $u$ to the aperture $t$ of the trough $b$, which is preferably located at a considerable distance therefrom, so that the fabric will dry to some extent and any surplus material drop off before it reaches the receptacle $b$, which is provided with a similar set of rollers, but preferably adjusted somewhat more closely together so as to grip the fabric tighter, and which may be fewer in number, say, three to five. While it is preferable to employ a trough, and cover it, it is not vital for this set of rollers, as it is not needed to hold the composition as is the case with the first set.

These rollers may also have a heated fluid applied thereto, through their hollow interiors, to assist in drying out the belt, but their primary function is to grip the belt tightly, so that it may be stretched in passing to the third trough or receptacle $c$, which is provided with a set of curing rollers similar to those in the other troughs, which are necessarily supplied with steam or other heating fluid at a high temperature, so as to cure the belt as it passes between them. I may of course omit the second trough and depend upon the rollers of the first trough to grip the belt tightly enough to stretch it as it passes to the third or curing trough. I may employ as many rollers in this trough as are necessary to cure it, ordinarily nine or eleven, but it will be apparent that the number of rollers necessary will depend upon the heat employed and the peripheral velocity of the rollers. Of course the closed trough acts as an oven and other heat may be applied to it than that applied to the interior of the rollers. By regulating the rate of speed at which the rollers run, the curing can be regulated to a nicety, so that the belt emerges from this trough or oven completely cured and ready to be wound up on a spool, or cut off into the desired lengths. The trough $c$ is necessarily located at a considerable distance from the trough $b$ in order to secure the desired stretching effect, which is preferably brought about by having the rollers in the trough $c$ run at a higher peripheral velocity than the rollers in the trough $b$, and I preferably secure this result by making the rollers in the two troughs of the same size, but running those in the trough $c$ at a slightly greater rate of speed, as indicated in the drawings by the fact that the sprocket wheel $s$ is smaller in diameter than the sprocket wheel $r$.

Instead of employing the simple chain and sprocket connection shown, I preferably interpose variable speed pulleys in the connections between the rollers of the two troughs, so that I am enabled to regulate the relative speed of the rollers so as to just stretch the belt to the desired extent.

The stretching effect between the troughs $b$ and $c$ is indicated in Fig. 2 by the fact that the belt $v$ where it enters the trough $c$ is narrower than where it emerges from the trough $b$.

By the employment of my invention, it will be apparent that I produce a belt by continuous operation, and that by varying the number, size and speed of the rollers, I am enabled to produce it at any rate of speed desired, thus making my method and apparatus very much more desirable than the methods and apparatus heretofore used.

To drive the apparatus slowly from a line shaft, I preferably employ the worm shaft w shown in Fig. 2, carrying a worm x meshing with a worm gear y secured on one of the shafts, and I might dispense with the chains n and q by adding a worm gear to a shaft in each trough and adding other worms to the shaft v, as indicated in dotted lines at w in Fig. 2.

While I have described my invention as embodied in the apparatus which I consider best adapted for carrying out its purposes, when the aforesaid original application No. 277,766 was filed, it will be understood that it is capable of modifications, and that I do not desire to be limited in the interpretation of the following claims except as may be necessitated by the state of the prior art.

What I claim as new and desire to secure by Letters Patent of the United States, is:

1. In an apparatus of the class described, the combination with the trough adapted to contain a liquid filling composition, of the adjustable bearing boxes mounted therein in horizontal alinement below the top of the trough, the rollers mounted in said boxes, and gearing for connecting and driving the rollers.

2. In an apparatus of the class described, the combination with the trough adapted to contain a liquid filling composition, of the adjustable bearing boxes mounted therein in horizontal alinement below the top of the trough, the rollers mounted in said boxes, and gearing for connecting and driving the rollers in unison.

3. In an apparatus of the class described, the combination with the trough adapted to contain a liquid filling composition, of the adjustable bearing boxes therein in horizontal alinement below the top of the trough, the hollow rollers mounted in said boxes, means for applying heat to the interior of the rollers, and gearing for connecting and driving the rollers.

4. In an apparatus of the class described, the combination with the plurality of troughs, of the adjustable bearing boxes mounted in each of said troughs, and means for driving the rollers of one of said troughs at a higher peripheral velocity than the others.

5. In an apparatus of the class described, the combination with the frame work, of the ways for bearing boxes on the sides thereof, the bearing boxes located in said ways, means for adjusting said bearing boxes to and from each other, and three or more rollers journaled in said bearing boxes in substantial alinement with each other, so that a belt may be not only gripped between the adjacent rollers but also stretched tightly about one half of the periphery of each of the intermediate rollers.

6. In an apparatus of the class described, the combination with the frame work, of the ways for bearing boxes on the sides thereof, the bearing boxes located in said ways, means for adjusting said bearing boxes to and from each other, three or more rollers journaled in said bearing boxes in substantial alinement with each other, so that a belt may be not only gripped between the adjacent rollers but also stretched tightly about one half of the periphery of each of the intermediate rollers, and gearing connecting all of the rollers for driving them in unison.

7. In an apparatus of the class described, the combination with the frame work, of the ways for bearing boxes on the sides thereof, the bearing boxes located in said ways, three or more hollow rollers having a hollow bearing at one end journaled in said bearing boxes in substantial alinement with each other so that a belt may be not only gripped between the adjacent rollers but also stretched tightly about one half of the periphery of each of the intermediate rollers, heating fluid pipes opening into the bearing boxes for the hollow bearings, and means for driving the rollers in unison.

8. In an apparatus of the class described, the combination with the frame work, of the ways for bearing boxes on the sides thereof, the bearing boxes located in said ways, means for adjusting said bearing boxes to and from each other, three or more rollers having a hollow bearing at one end journaled in said bearing boxes in substantial alinement with each other so that a belt may be not only gripped between the adjacent rollers but also stretched tightly about one half of the periphery of each of the intermediate rollers, heating fluid pipes opening into the bearing boxes containing the hollow bearings, and gearing connecting all the rollers for driving them in unison.

9. In an apparatus of the class described, the combination with the trough, of the bearing boxes mounted therein, the rollers mounted in said boxes, a frame work, ways for bearing boxes on the sides of said frame work, the bearing boxes located in said ways, means for adjusting said bearing boxes to and from each other, three or more hollow rollers having a hollow bearing at one end journaled in said bearing boxes in substantial alinement with each other so that the belt may be not only gripped between the adjusting rollers but also stretched tightly about one half of the periphery of each of the intermediate rollers, heating fluid pipes opening into the bearing boxes of the hollow bearings, and means for driving the rollers of both series so as to stretch the belt as it passes from the first series to the second.

10. In an apparatus of the class described, the combination of one series of rollers mounted in a trough, of the second series of rollers mounted in a frame work, said second series of rollers being journaled in substantial alinement with each other so that a belt may be not only gripped between the adjacent rollers but also stretched tightly about one half of the periphery of each of the intermediate rollers, means for adjusting the rollers to and from each other in order to grip the belt, gearing connecting all the rollers for driving them so that a belt will be stretched in passing from the first series to the second series, and means for heating the rollers on second series to cure a belt passing thereover while it is stretched.

11. In an apparatus of the class described, the combination with the closed trough, of the ways for bearing boxes on the sides thereof, the bearing boxes located in said ways, means for adjusting said bearing boxes to and from each other, three or more rollers journaled in said bearing boxes in substantial alinement with each other so that the belt may not only be gripped between the adjacent rollers but also stretched tightly about one half of the periphery of each of the intermediate rollers, and means for heating the trough.

12. In an apparatus of the class described, the combination with the closed trough, of the ways for bearing boxes on the sides thereof, the bearing boxes located in said ways, means for adjusting said bearing boxes to and from each other, three or more rollers journaled in said bearing boxes in substantial alinement with each other so that the belt may not only be gripped between the adjacent rollers but also stretched tightly about one half of the periphery of each of the intermediate rollers, means for heating the trough, and gearing connecting all the rollers for driving them in unison.

13. In an apparatus for the purpose described, the combination with a framework, of adjustable bearing boxes mounted therein, three or more rollers journaled in said bearing boxes in substantial alinement with each other so that a belt may be not only gripped between the adjacent rollers but also stretched tightly about one half of the periphery of each of the intermediate rollers, said rollers being provided with circular grooves in their peripheries, the crests of the grooves on each roller being directly opposite the hollows of the grooves of the adjacent rollers, and continuously meshing gearing for connecting and driving the rollers so that the material will be carried continuously between said adjacent rollers directly by the continuous rotation thereof.

14. In an apparatus for the purpose described, the combination with a framework, of adjustable bearing boxes mounted therein, three or more rollers journaled in said bearing boxes in substantial alinement with each other so that a belt may be not only gripped between the adjacent rollers but also stretched tightly about one-half of the periphery of each of the intermediate rollers, said rollers being provided with circular grooves in their peripheries, the crests of the grooves on each roller being directly opposite the hollows of the grooves of the adjacent rollers, means for applying heat to the interior of the rollers, and continuously meshing gearing for connecting and driving the rollers so that the material will be carried continuously between said adjacent rollers directly by the continuous rotation thereof.

15. In an apparatus of the class described, the combination with one series of rollers having circular corrugations on their peripheries mounted in a trough, of a second series of rollers mounted in a framework having circular corrugations on their peripheries, the grooves of the second set of rollers being slightly narrower and closer together than those of the first set, said second series of rollers being journaled in substantial alinement with each other so that a belt may be not only gripped between the adjacent rollers but also stretched tightly about one-half of the periphery of each of the intermediate rollers, means for adjusting the rollers to and from each other in order to grip the belt, gearing connecting all the rollers for driving them so that the belt will be stretched in passing from the first series to the second series, and means for heating the rollers of the second series to cure a belt passing thereover while it is stretched.

16. In an apparatus of the class described, the combination with one series of rollers having circular corrugations on their peripheries mounted in a trough, of a second series of rollers mounted in a framework having circular corrugations on their peripheries, the grooves of the second set of rollers being slightly narrower and closer together than those of the first set, said second series of rollers being journaled in substantial alinement with each other so that a belt may be not only gripped between the adjacent rollers but also stretched tightly about one-half of the periphery of each of the intermediate rollers, means for adjusting the rollers to and from each other in order to grip the belt, and gearing connecting all the rollers for driving them so that the belt will be stretched in passing from the first series to the second series.

17. In an apparatus of the class described, the combination with one series of rollers having circular corrugations therein mounted in a trough, of a second series of rollers having similar circular corrugations with their grooves slightly narrower and closer together than those of the first set, said second series of rollers being journaled in substantial alinement with each other so that a belt may be not only gripped between the adjacent rollers but also stretched tightly about one-half of the periphery of each of the intermediate rollers, means for adjusting the rollers to and from each other in order to grip the belt, and gearing connecting all the rollers for driving them so that the belt will be stretched in passing from the first series to the second series.

In witness whereof I have hereunto set my hand and affixed my seal this 18th day of February, A. D. 1907.

JOHN W. BLODGETT. [L. S.]

Witnesses:
JOHN H. MCELROY,
M. S. REEDER.